Figure 1:
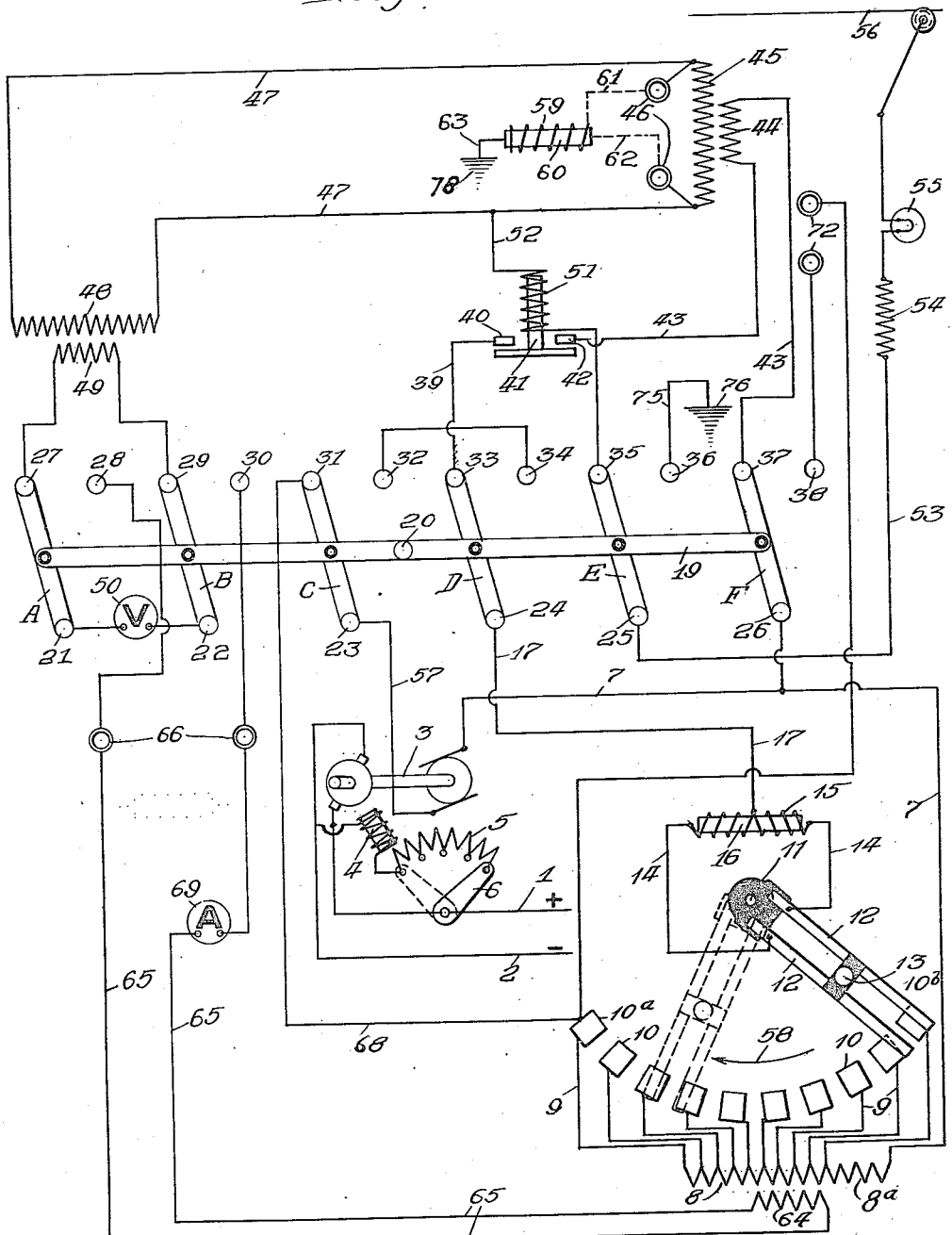

A. H. DAUS.
TESTING APPARATUS.
APPLICATION FILED AUG. 6, 1915.

1,214,141.

Patented Jan. 30, 1917.
2 SHEETS—SHEET 1.

Witness:
R. L. Farrington

Adolph H. Daus
By Albert Scheible Atty.

UNITED STATES PATENT OFFICE.

ADOLPH H. DAUS, OF CHICAGO, ILLINOIS.

TESTING APPARATUS.

1,214,141.  Specification of Letters Patent.  Patented Jan. 30, 1917.

Application filed August 6, 1915. Serial No. 43,991.

*To all whom it may concern:*

Be it known that I, ADOLPH H. DAUS, citizen of the United States, residing at Chicago, in the county of Cook and State of Illinois, have invented certain new and useful Improvements in Testing Apparatus; and I do hereby declare the following to be a full, clear, and exact description of the invention, such as will enable others skilled in the art to which it appertains to make and use the same.

My invention relates to electric testing apparatus, its general objects being to provide a simple, compact, safe and easily manipulated apparatus for supplying current of various voltages, amperages and periodicities.

More particularly, my invention aims to provide simple means for enabling a single transformer to be used either in producing a high voltage current for insulation breakdown tests, or as a booster for supplying a current of moderately high voltage and amperage, or as a step-down transformer for furnishing a large volume of current; to enable a single commutating switch to be used in gradually and uninterruptedly raising the voltage or the amperage of the induced current, or in varying the extent to which the voltage in the supply current is boosted: to provide simple means for varying the rate of alternations of the current, thereby altering the volume of current forced through a given coil against the reactance effect of the iron adjacent to the said coil: to provide simple and unmistakable means for simultaneously changing the connections to the switching device and the transformer for converting the latter from a step-up to a step-down transformer or to a booster: to provide simple and positive safety means for preventing the high voltage current from being used without previously grounding one terminal, thereby reducing the risk of accidents to the operator: to provide means for enabling an ordinary trolley current to actuate the said safety means: to provide signal means for indicating when the proper safety provision has been made by the said grounding: to provide means for automatically transferring the operative circuit connections from a voltmeter to opposite windings of the main transformer when the latter is changed from step-up to step-down connections: and to provide means for enabling a single multi-point switch to be used for regulating the main transformer when used either as a step-down transformer, or as a voltage controller for an auxiliary step-up transformer, or as a booster.

While the apparatus of my invention may be used in connection with various classes of tests and on widely varying types of electrical machinery, it is particularly suited for use in testing electric railway motors and is here described as arranged and applied for that purpose.

Figure 2:
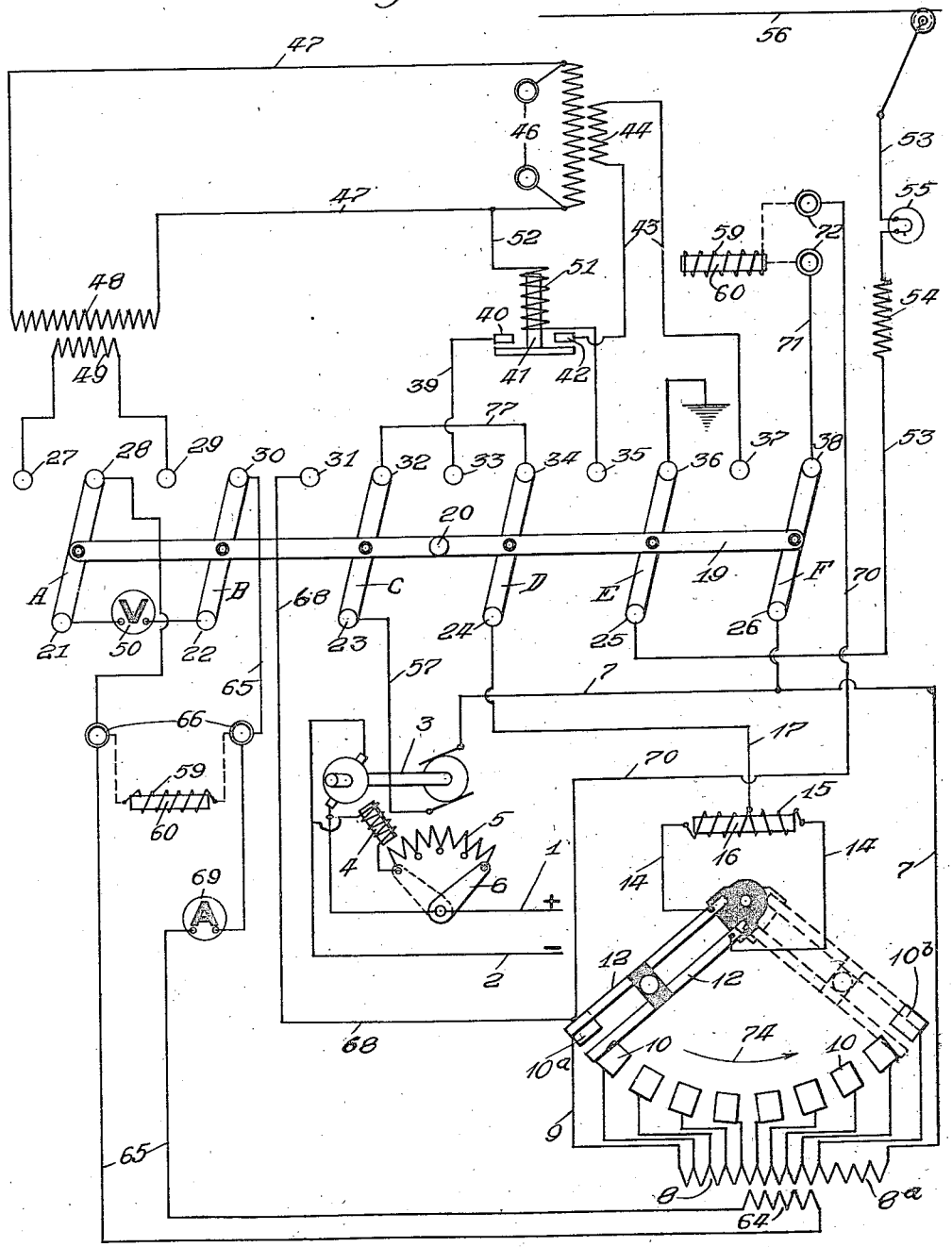

In the drawings, Figure 1 is a diagram showing such an apparatus as used for high-voltage insulation testing, while Fig. 2 shows the same apparatus as used either for heavy current testing, or for tests requiring both moderate current and moderate voltage.

In the embodiment of the drawings, I use a direct current supplied on the conductors 1 and 2 from any accessible source for driving a rotary converter 3, which converter has its field 4 in series with an adjustable resistance 5 controlled by a movable contact arm 6. Permanently connected to one terminal of the alternating generator end of the converter 3 by a conductor 7 is one end of the longer winding 8 of a transformer, which winding is connected at various points by wires 9 to contacts 10. These contacts are arranged in an arc about a pivot 11 on which is mounted a swinging arm including a pair of parallel contact bars 12 and a handle 13.

The bars 12 and the contacts 10 are relatively so spaced that one or the other of the bars will always bear against one of the contacts when the swinging arm is moved on its pivot, but that neither of the bars will bridge across the gap between two successive contacts. Connected to the bars 12 by wires 14 are the oppositely directed windings 15 of a reactance coil 16, which windings have their juncture connected by a wire 17 to a pivot 24, the latter being one of the six pivots of a six-bladed throw-over switch having all of its blades connected by a cross-bar 19 so as to be simultaneously operable by a handle 20.

When the throw-over switch is in the position of Fig. 1, the blade D pivoted on the pivot 24 contacts at its free end with a contact 33 connected by a wire 39 to one terminal 40 of a normally open relay 41, while the other terminal 42 of this relay is connected by a wire 43 through the primary 44 of a step-up transformer to the contact 37 engaged by the switch blade F. This latter blade is connected through its pivot 26 and the wire 7 with the aforesaid terminal of the rotary converter, while the other terminal of the latter is connected through switch-blade C and a wire 68 to the end contacts 10ª. Operatively opposed to the primary 44 is a secondary 45 connected to sockets 46 adapted to receive wire-attaching plugs, and also connected by wires 47 to the longer winding 48 of an auxiliary step-down transformer which has its shorter winding 49 connected through the switch blades A and B to a voltmeter 50. The winding 51 of the relay 41 is in a conductor 52 leading from one of the wires 47 to the switch blade E, which connects through a wire 53, resistance 54 and lamp 55 to a trolley wire 56.

While one of the alternating current terminals of the rotary converter is connected through wires 57 and 68 to one of the end contacts (10ª) of the commutating switch, the wire 7 from the other terminal does not lead directly to the opposite end contact (10ᵇ) but has a portion 8ª of the multi-sectioned transformer winding interposed, so that this commutating switch serves to vary the active winding from the portion 8ª to the entire length. Assuming the relay 41 to be closed and the commutating arm to be in the position shown in full lines in Fig. 1, the winding 8 would receive the full voltage of the rotary converter at its terminals, but the primary 44 would only receive that proportion of the winding 8 corresponding to the turns 8ª. However, upon moving the contact arm in the direction shown by the arrow 58, the proportion of the winding connected to the primary 44 will be gradually increased as the arm is shifted from one to another of the contacts 10, thereby increasing the voltage in the primary 44 and hence that supplied to the sockets 46 by the secondary 45, which latter voltage shows upon the voltmeter 50.

To reduce the risk of accidents when using the high voltage current available at the sockets 46, I preferably arrange the safety relay 41 so as to normally maintain an open circuit between the contacts 40 and 42. Then, with the connections as shown in full lines in Fig. 1, this relay will disconnect the coil 44 from the supply of alternating current and hence render the secondary 45 inoperative. In using this part of the apparatus for insulation tests, as on a magnet winding 59, this winding and its core 60 are connected respectively by wires 61 and 62 to the sockets 46, but since the relay 41 is open, these connections only lead to the trolley wire 56 and hence expose the operator only to a maximum voltage corresponding to that of the trolley circuit.

To complete the test conditions, the core 60 of the magnet which is to be tested must also be grounded, as by a wire 63, whereupon the current flowing from the trolley wire 56 through the wire 53 will actuate the relay 51 and will close the connections to the high voltage transformer having the secondary coil 45. Consequently, the maximum voltage to which the operator may be exposed as long as one wire of the high voltage circuit is not grounded will be that of the trolley circuit, since the high voltage circuit will only be completed and available for test purposes after one side of it has been grounded. In passing through the wire 53, the current actuating the relay also lights the lamp 55, thus giving the operator a positive indication that the high tension test circuit is grounded and completed so as to be available for test purposes.

To use the same apparatus for tests requiring a large volume of current at comparatively low voltages, the switch blades are thrown over by the handle 20 to the position of Fig. 2, thereby entirely disconnecting the transformer coils 44 and 45 from the source of current and connecting the voltmeter 50 through wire 65 to the shorter winding 64 of the main transformer, which shorter winding is operatively opposed to the multi-sectioned winding 8. With the switches thus in the low-voltage position, the terminal wire 57 of the source of alternating current is disconnected from the wire 68 leading to the end contact 10ª, and is connected through the blades C and D and conductors 77 and 17 to the neutral point of the reactance 16 and thence to the contact blades 12. Then, with the commutating arm in the position shown in full lines in Fig. 2, the source of alternating current will be operatively connected to all sections of the multi-sectioned winding. By moving the commutating arm in the direction of the arrow 74, the length of the active part of the winding 8 will be decreased, thereby increasing the volume of current induced in the secondary 64 and supplied through the wires 65 to sockets 66. Thus a gradually increased current can readily be supplied to any coil 59 connected to the socket 66 by suitable plugs, the volume of the current being read from an ammeter 69 when the contact arm is in the position shown in full lines in Fig. 2, the main transformer furnishes its maximum step-down ratio, thereby impressing a correspondingly low voltage on the wires 65 and on any winding 59 connected to the sockets 66, and the current forced through this winding will depend on the reactance. Owing to the large amount of iron commonly used on railway motor parts, this reactance is usually high, hence the volume of current forced through a given winding connected to the sockets 66 may not be adequate for some test purposes when the periodicity is the same as that suitable for the high voltage insulation tests. I therefore preferably provide means for regulating the speed of the motor-generator, as for example by providing an adjustable resistance 5 in series with the field 4 of the driving portion of the motor-generator, so that by moving the arm 6 I can reduce the rate of alternations and hence decrease the reactance which checks the flow of current through the winding 59. In this way, I can easily double the volume of current forced through the test winding without increasing the size of the motor-generator.

The end contact 10ᵃ permanently connected to one of a pair of sockets 72, the other of which sockets is connected by the switch blade F to the wire 7 leading to the opposite end of the multi-sectioned winding, so that with the switches in their low-voltage position the sockets 72 will be in shunt with the entire length of this multi-sectioned transformer winding. Then, with the commutating arm in the position of the full lines of Fig. 2, the sockets 72 will receive simply the voltage of the motor-generator and this voltage may be used for insulation testing as shown near the upper right hand corner in Fig. 2. However, if the commutating arm is now moved in the direction of the arrow 74, the alternating current will be supplied to a gradually lessened part of the winding 8, while the sockets 72 will remain connected to the entire length of this winding. Consequently, the main transformer of which this winding forms a part will become a booster for the voltage supplied to the sockets 72, thereby enabling the latter to be used for tests requiring a voltage greater than that of the motor generator but less than that furnished at the sockets 46 by the step-up transformer. As this moderate voltage is usually not high enough to expose the operator to a serious risk of shocks, the relay 41 is disconnected from the circuits throughout the low-voltage position of the switch blades, but blade E connects the wire 53 with an auxiliary ground 76, thus lighting the lamp 55 which may conveniently be used for illuminating the ammeter 69 and the voltmeter 50.

It will be obvious from the above that my apparatus lends itself readily to a large variety of tests. For example, if an armature has a defective spot in its insulation, connections are made to the sockets 46 as in Fig. 1 and the voltage is gradually increased until a sudden fluctuation of the volt-meter shows that the insulation has been punctured at the defective point. Sometimes, the puncturing discloses the spot by setting fire to the insulation. If not, the coils of the armature may then be connected to the plugs 72 as in Fig. 2 and the main transformer may be operated as a voltage booster for forcing a moderate current through the armature coils. If this is insufficient for disclosing the defective spot by "burning it out," the armature coils may be connected to the step-down coil 64 through the sockets 66, whereupon a manipulating of both the contact arm and the field control arm 6 will permit the current through the armature coils to be raised to the required volume. So also, the high voltage currents from the sockets 46 may be supplied simultaneously to the several field coils of a street railway motor and a short-circuit in any one of the coils may be detected by the difference in heating between that coil and the others.

Aside from the necessary connections to the proper sockets and from the grounding required with high voltage tests (which grounding is insured by the use of the relay and lamp circuit), my apparatus involves very little manipulating and no change whatever in the switchboard or transformer wiring when shifting from one to another of the different voltages and current obtainable with my appliance. Consequently, its use may easily be taught to a man with no particular knowledge of electricity, and owing to the increase in capacity obtained by varying the rate of alternations, the entire apparatus as required for tests on street railway motors may be built in compact and relatively cheap form. However, I do not wish to be limited to this application of my invention, nor to such details as a double-bladed commutating arm or of a resistance motor speed regulation, it being obvious that the various details of construction might be varied in many ways without departing from the spirit of my invention.

Neither do I wish to be limited to the use of my apparatus for the particular purposes heretofore described, or in the particular manner which I have set forth, as the same will lend itself to an endless variety of tests. For example, while I have described my apparatus as used in break-down tests on a magnet winding, it may be used with equal facility for detecting and locating poor insulation spots or grounds in any other parts of electrical machinery or apparatus by making suitable connections to the sockets 46. So also, the heavy current available at the sockets 66 may be used for burning out a ground in any electrical device, for thawing out frozen water pipes, for electric seam or spot welding, etc. Or, by thus obtaining an overload current and sending the same through the windings of an armature, the latter may be heated sufficiently to soften in insulation on the binding tapes, thus permitting the banding wires to be drawn effectively taut. Heretofore, it has been necessary to place a rewound armature into an oven for several hours to effect this needed softening of the surface insulation prior to rebanding the armature. With my apparatus, the same heating can be obtained without moving the armature from the winding stand and in a small fraction of the time required for the oven heating. Likewise, as a check on the condition of a rewound motor armature, it has long been customary to mount the same in its normal operative position and to run the same under overload conditions produced by applying brakes: then, in case of any show of defects, the armature had to be removed from its normal mounting and subjected to additional tests for locating the defective spot or spots, such as poorly soldered connections. With my apparatus, the sockets 66 enable me to supply an overload current to the armature while stationary on a rack where it may be carefully watched during the heating, it being unnecessary to rotate the armature since the fluctuating magnetic flow produced by the use of the alternating current substantially duplicates the operating conditions to which the armature is subjected in practice. However, the armature when thus mounted and connected may easily be rotated by hand so as to show by flashing under the brush which coil has an open circuit or a loose connection, thus enabling the defective spots to be quickly located. Thus, my apparatus enables a wide variety of tests to be made in rapid succession, many of them with an accurate simulation of operative conditions, thereby greatly reducing both the time and the expense of the tests for which independent pieces of apparatus have heretofore been used and likewise greatly reducing the time during which any defective piece of machinery or apparatus is laid up for repairs.

I claim as my invention:

1. In an apparatus for testing the insulation between a conductor and a metal member adjacent thereto, a source of current having one terminal thereof grounded, a ground connection for said metal member, a source of alternating current, a step-up transformer having its secondary terminals connected respectively to said conductor and said member, a source of alternating current connected to the primary of the transformer, and a circuit-controller interposed between the said member and the other terminal of said source of current and controlling the supply of alternating current to the said primary.

2. In an apparatus for testing the insulation of a conductor on a motor used on a trolley circuit having a ground return, a step-up transformer having its secondary terminals respectively connected to said conductor and to a ferrous part of the motor, a source of alternating current connected to the primary terminals of the transformer; a normally open circuit-closer in circuit with the primary of said transformer; and means controlled by a grounding of the said ferrous part of the motor for actuating said circuit-closer.

3. In an apparatus for use with a source of alternating current in testing grounded-circuit motors, a step-up transformer, rupturable connections between the primary of said transformer and the source of current, means actuated by a grounding of the secondary transformer circuit for controlling said connections, and visual means for indicating the closing of the said connections by the said grounding.

4. In an apparatus for use with a source of alternating current in testing grounded-circuit motors, a step-up transformer, rupturable connections between the primary of said transformer and the source of current, means actuated by a grounding of the secondary transformer circuit for controlling said connections, and means for simultaneously controlling the connections of the primary and secondary of the transformer to the source of current and the said means respectively.

5. In a testing apparatus for use with a pair of alternating current supply wires, a multi-sectioned transformer winding permanently connected at one end to one of said wires, an interruptible connection between the other wire and the other end of said winding, a commutating switch affording an adjustable connection to the respective sections of said winding, a step-up transformer having its primary in shunt with the part of said winding between said commutating switch and the first named end of the winding, a pair of sockets connected to the secondary of the step-up transformer, a second pair of sockets normally having only one thereof connected to one of said wires: and switching means for transferring the connection to the second wire from one end of the winding to the commutating switch, and for simultaneously therewith transferring the connection of the other wire from the primary of the step-up transformer to the other of said second pair of sockets.

ADOLPH H. DAUS.